(No Model.)  B. A. SPAULL.  5 Sheets—Sheet 1.
APPARATUS FOR THE MANUFACTURE OF GLASS BOTTLES.
No. 503,220.  Patented Aug. 15, 1893.

Witnesses.
Claude Kesler
John Cullen

Inventor.
Barnard Alfred Spaull,
By John J. Halsted & Son
his Attys (No Model.) 5 Sheets—Sheet 2.
B. A. SPAULL.
APPARATUS FOR THE MANUFACTURE OF GLASS BOTTLES.
No. 503,220. Patented Aug. 15, 1893.
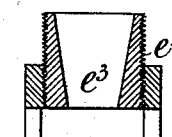
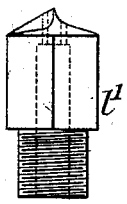
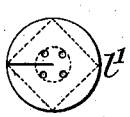
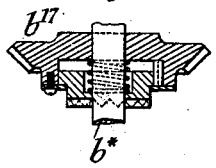
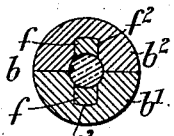
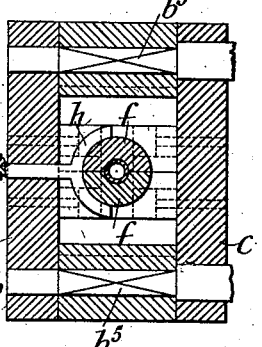
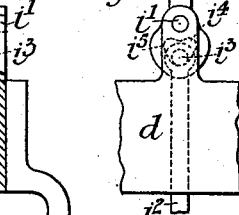
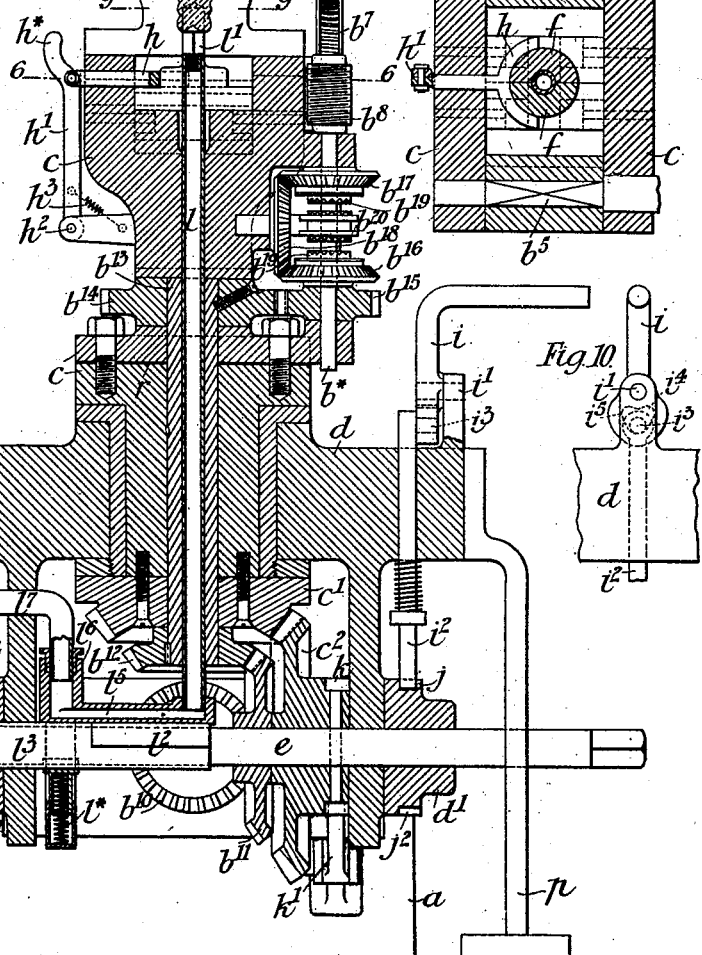
Witnesses. Inventor.

(No Model.) 5 Sheets—Sheet 3.

B. A. SPAULL.
APPARATUS FOR THE MANUFACTURE OF GLASS BOTTLES.

No. 503,220. Patented Aug. 15, 1893.

Witnesses.
Claude Kesler.
John Cullen.

Inventor.
Barnard Alfred Spaull
By John J. Halsted & Son, his Att'ys (No Model.)
B. A. SPAULL.
APPARATUS FOR THE MANUFACTURE OF GLASS BOTTLES.
No. 503,220. Patented Aug. 15, 1893.
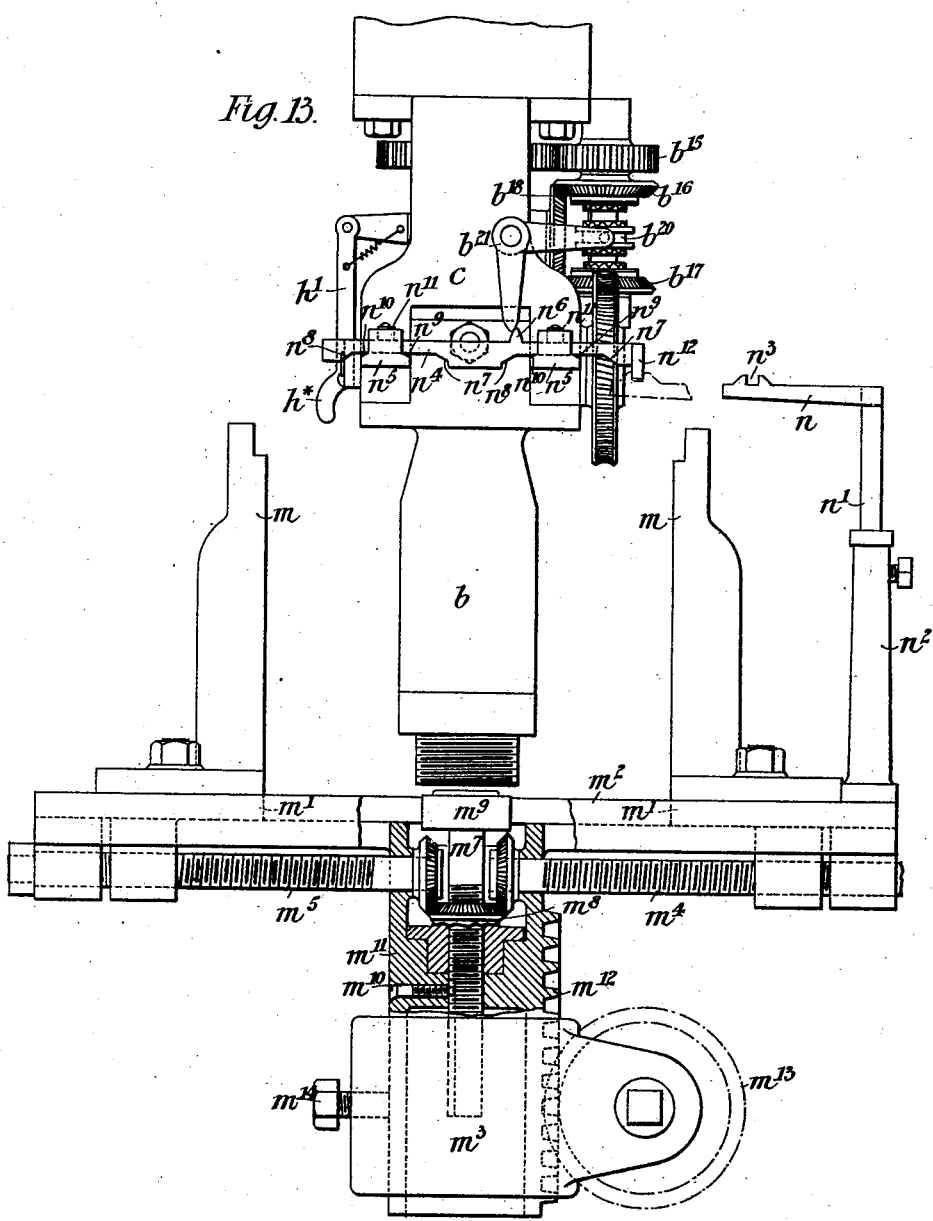

(No Model.) 5 Sheets—Sheet 5.
B. A. SPAULL.
APPARATUS FOR THE MANUFACTURE OF GLASS BOTTLES.
No. 503,220. Patented Aug. 15, 1893.
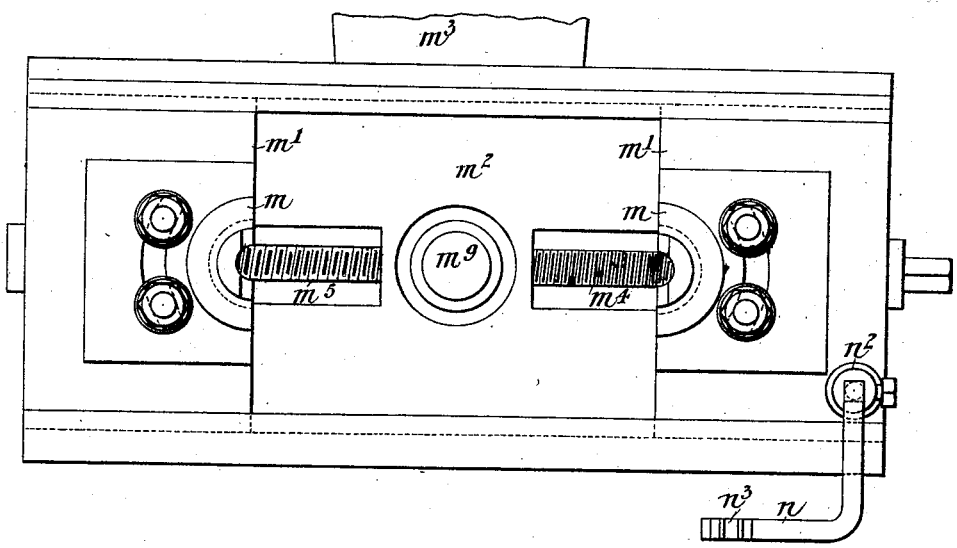
Fig. 14.
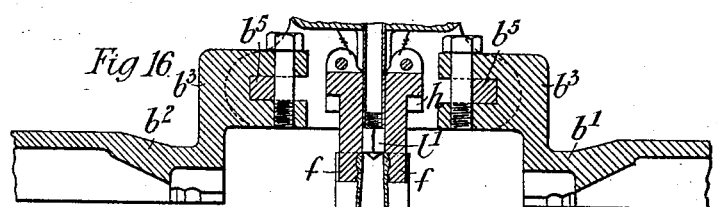
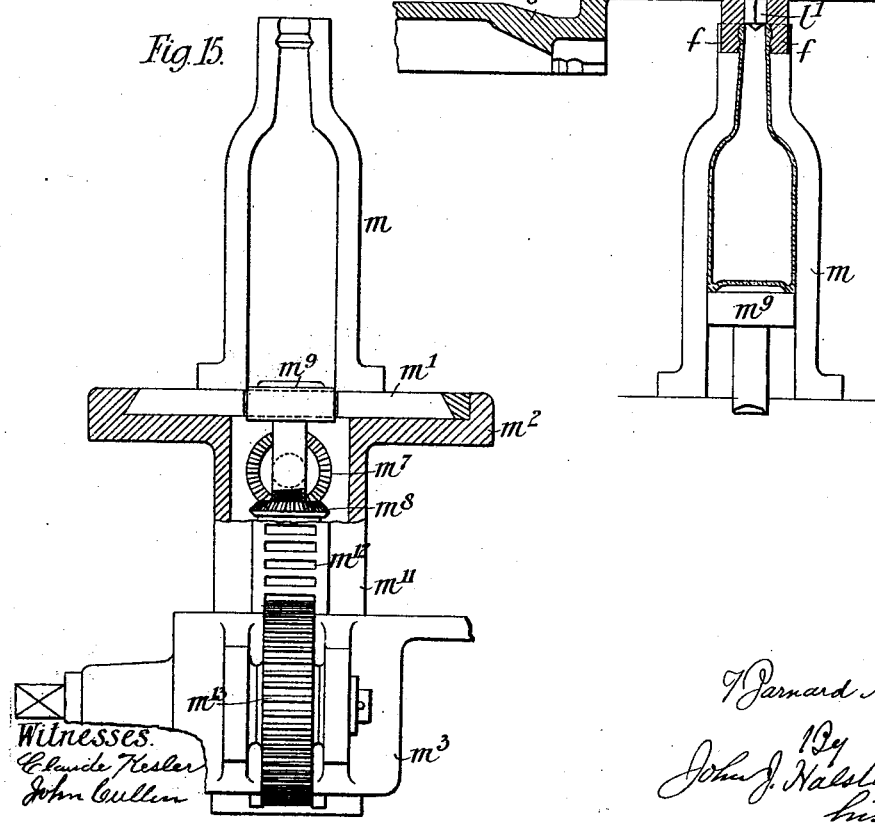
Fig. 15. Fig. 16.
Witnesses:
Claude Kesler
John Cullen
Barnard Alfred Spaull
Inventor.
By John J. Halsted & Son
his Att'ys

UNITED STATES PATENT OFFICE.

BARNARD ALFRED SPAULL, OF LONDON, ENGLAND.

APPARATUS FOR THE MANUFACTURE OF GLASS BOTTLES.

SPECIFICATION forming part of Letters Patent No. 503,220, dated August 15, 1893.

Application filed June 8, 1892. Serial No. 435,994. (No model.)

*To all whom it may concern:*

Be it known that I, BARNARD ALFRED SPAULL, a subject of the Queen of Great Britain, residing at London, England, have invented new and useful Improvements in Apparatus for the Manufacture of Glass Bottles and the Like, of which the following is a specification.

My invention relates to the manufacture of glass bottles and other glass hollow ware.

According to my invention I employ a funnel-shaped vessel which I term a "marver" into which the glass to be blown is placed, the said marver being adapted to be rotated to produce a somewhat similar action upon the glass to that produced when rolling glass upon an ordinary marver. My marver is preferably made in two parts adapted to be opened to enable the "parison" to be removed therefrom and is designed to be rotated upon its longitudinal axis. The marver is preferably mounted in such a manner that when inoperative it stands in a substantially vertical position with its open end uppermost, that it can be moved to a position approximately horizontal, and that it can finally be moved to remove the parison from the marver. At the point where the marver is opened to uncover the parison I advantageously arrange molds designed to take the parison from the marver and to hold it while the final blowing and finishing of the bottle is effected. The mold is then opened and the bottle removed.

To enable my invention to be fully understood I will describe the same by reference to the accompanying drawings, in which—

Figure 1:
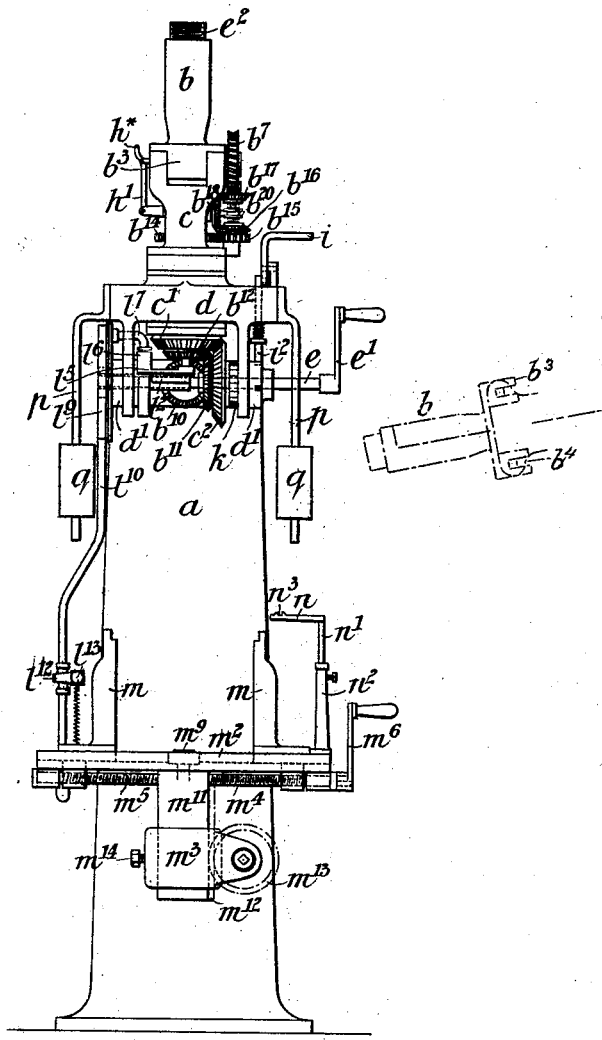
Figure 2:
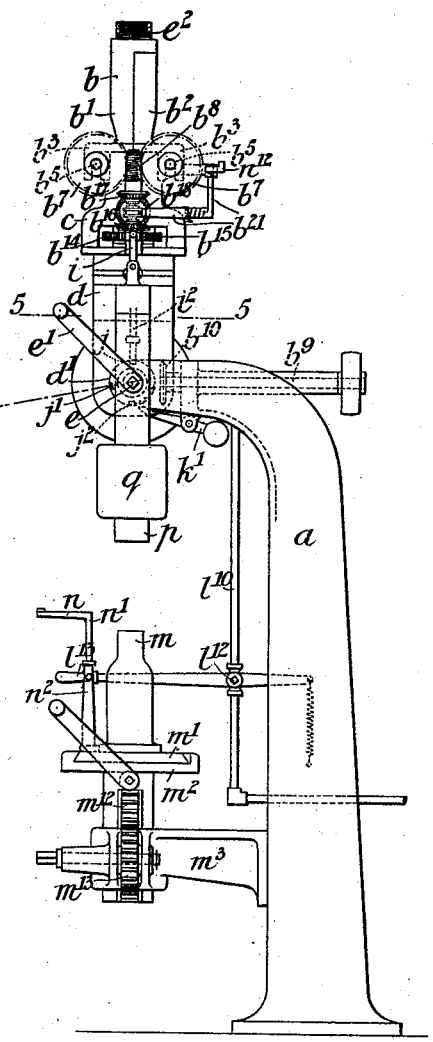
Figure 4:
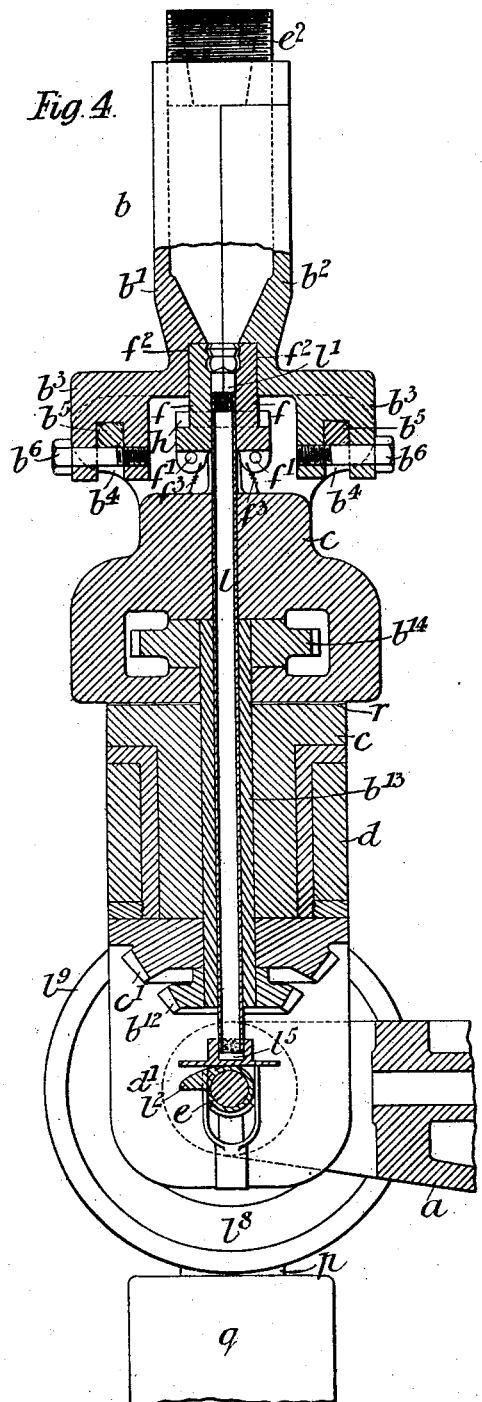
Figure 5:
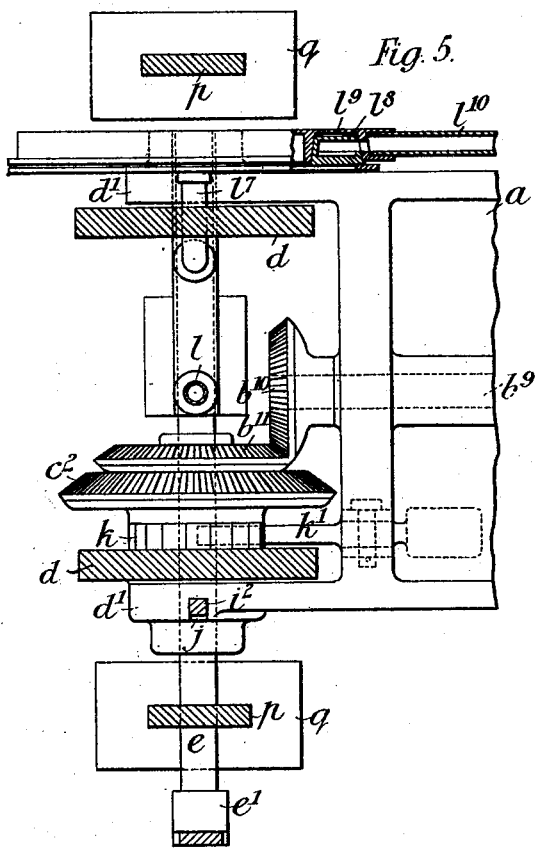
Figure 8:
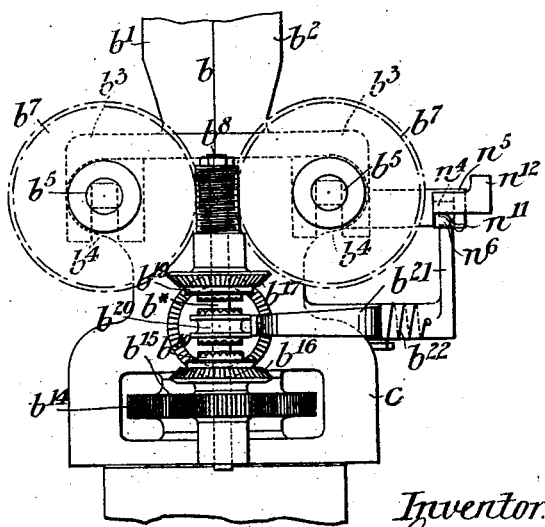

Figure 1 is a front elevation of a machine embodying my improvements; and, Fig. 2 is a side elevation of the same. Fig. 3 is a longitudinal section drawn to an enlarged scale through the marver and the parts immediately in connection with it. Fig. 4 is a sectional view similar to Fig. 3 but taken at right angles thereto. Fig. 5 is a section drawn to the same scale as Figs. 3 and 4 on the line 5 5, Fig. 2. Fig. 6 is a section on the line 6 6, Fig. 3. Figs. 7 to 12 are views illustrating details of the apparatus and hereinafter described. Fig. 13 is a sectional elevation showing the mold with its parts in their open position and the marver in the position which it occupies immediately prior to opening to release the parison. Figs. 14 and 15 are a plan and sectional end elevation of the same without the marver. Fig. 16 is a section illustrating the operation of the apparatus.

Similar letters of reference indicate corresponding parts in the several figures.

$a$ indicates a standard or frame carrying the working parts, and $b$ indicates the marver which is cylindrical and, as shown in Figs. 3 and 4, is bored out substantially parallel for part of its length and then narrowed or tapered to the molding for forming the mouth of the bottle.

The marver is divided longitudinally to form two parts $b'$, $b^2$, each of which has formed integral with it a projecting portion $b^3$ having in it a slot $b^4$ designed to receive a square spindle $b^5$. This method of mounting the parts of the marver upon their spindles permits of marvers of varying size being applied to the machine. The two parts of the marver are fixed upon these spindles by means of pins $b^6$, $b^6$, the said spindles serving as the pivots upon which the two parts of the marver turn in opening and closing. The spindles $b^5$, $b^5$ are pivoted in bearings in a casting $c$, as shown in Fig. 6.

The casting $c$ is rotatably mounted in a frame $d$ pivoted on a shaft $e$ carried in bearings $d'$, $d'$ at the upper extremity of the standard $a$. At the lower end of the casting $c$ is a bevel-wheel $c'$ which gears with a bevel-wheel $c^2$ upon the shaft $e$ so that when the said shaft is rotated, for instance, by means of a handle $e'$ thereon rotary motion will be imparted to the marver.

Upon the spindles $b^5$, $b^5$ are worm-wheels $b^7$, $b^7$ which are in gear with a worm $b^8$ between them. This worm derives its motion from a shaft $b^9$ carried in a bearing upon the upper part of the standard $a$ and adapted to be driven through the medium of a belt and pulley from any suitable motor. This shaft has upon its inner end a bevel-wheel $b^{10}$ which gears with a bevel-wheel $b^{11}$ running loosely upon the shaft $e$, and this bevel-wheel $b^{11}$ in its turn gears with a third bevel-wheel $b^{12}$ attached to one end of a tubular shaft $b^{13}$ having upon its other end a gear-wheel $b^{14}$ engaging with a pinion $b^{15}$ loosely mounted upon the shaft $b^*$ of the worm $b^8$. This shaft also has loosely mounted upon it two bevel-wheels $b^{16}$, $b^{17}$, the former of which is attached to the gear-wheel $b^{15}$ while the latter derives its motion from the bevel-wheel $b^{16}$ through the intervention of the idle bevel-wheel $b^{18}$. In the adjacent faces of the wheels $b^{16}$, $b^{17}$ are rings of clutch-teeth $b^{19}$, $b^{19}$ preferably of the shape shown in Fig. 3 and in Fig. 7, (which is a section drawn to an enlarged scale of the wheel $b^{17}$) and between these two sets of clutch-teeth and sliding upon the shaft of the worm $b^8$ is a clutch-box $b^{20}$ connected to the said shaft by a spline or feather. Each of the rings of teeth $b^{19}$, $b^{19}$ engages with its wheel by a spline and has a spring arranged behind it to enable the ring of teeth in engagement with the clutch-box to yield and thereby prevent the breakage of the clutch-teeth in case the marver should be fully opened or fully closed before the clutch-box is thrown out of gear as hereinafter described. With this arrangement it is obvious that when the clutch-box is in engagement with, say, the clutch-teeth $b^{19}$ of the wheel $b^{16}$ the worm will be rotated in one direction and when in engagement with the clutch-teeth $b^{19}$ of the wheel $b^{17}$ it will be rotated in the opposite direction. The motion of the clutch-box to effect its engagement with one or the other set of clutch-teeth $b^{19}$ is effected through the medium of a bell-crank lever $b^{21}$ operated as hereinafter described, and connected to a spring $b^{22}$, Fig. 8, (which is an elevation at right angles to Fig. 3 of the gearing and connected parts by which the marver is opened and closed) which normally retains the free arm of the said lever $b^{21}$ in one position.

In order that when the marver is opened the parison shall be supported until inclosed in the mold I provide two gripping pieces $f$, $f$ forming a kind of tongs which are adapted at their free ends to form with the marver the neck molding. These gripping pieces $f$, $f$ are pivoted to the casting $c$ at $f'$, $f'$ and are held in their proper position during the formation of the parison by the contact of the parts $b'$ $b^2$ of the marver therewith, suitable recesses $f^2$, $f^2$ being formed in the said parts of the marver to receive the ends of the tongs, as shown in Fig. 4 and in Fig. 9 which is a section on the line 9 9, Fig. 3. Springs $f^3$, $f^3$ connected to the casting $c$ and to the gripping pieces $f$, $f$ serve to constantly press the said gripping pieces toward each other. In order that the gripping pieces shall retain their hold upon the parison during the time that the latter is being free from the marver and inclosed by the mold, I provide the fork $h$ which slides through a suitable slot in the casting $c$ and with its bifurcated end is adapted to embrace the two parts of the tongs, as shown in Fig. 6. This fork is connected to a lever $h'$ pivoted at $h^2$ to a bracket upon the casting $c$ and is acted upon by a spring $h^3$ which normally tends to retain the fork in engagement with the tongs.

As hereinbefore stated the frame $d$ carrying the casting $c$ is mounted upon the shaft $e$. In order to provide for moving the said casting around the said shaft $e$ for the purpose of moving the marver to its various positions and for locking it in these positions I provide the lever-handle $i$ pivoted at $i'$ to the frame $d$ and connected with a spring-catch $i^2$ designed to engage with one or the other of a series of notches $j, j', j^2$ in one of the bearings $d'$ of the frame $a$, the position of the said notches corresponding with the different positions in which it is required to place the marver. The lever-handle $i$ is connected with the spring-catch $i^2$ through the medium of a pin $i^3$ on the latter entering a cam-slot $i^4$ in the said lever-handle, as shown in Fig. 10, which is a view drawn to an enlarged scale of the said handle and part of the spring-catch. This cam-slot has its surface $i^5$ eccentric to the pivot $i'$, as shown in the said Fig. 10, so that when the said lever is pulled the first effect will be to raise the spring-catch out of engagement with the notch in which it is then located and the next to pull round the frame $d$ to the required position.

As, during the time that the marver is being moved from the position shown in full lines in Fig. 2 to the position shown in dotted lines, it might be difficult for the operator at the same time to impart rotary motion to the marver by the handle $e'$, I provide for causing the swinging movement of the marver around the shaft $e$ to cause the rotation of the marver. This I accomplish by forming upon the bevel-wheel $c^2$ ratchet-teeth $k$ with which a pawl $k'$, Fig. 2, pivoted to the standard $a$ is in engagement. This ratchet and pawl are arranged in such a manner that when the marver is swung down as hereinbefore stated, the said shaft $e$ with the gear-wheel $c^2$ will be held stationary, whereby rotary motion will be imparted to the marver owing to the engagement of the bevel-wheel $c'$ with the bevel-wheel $c^2$.

When the marver is in the position indicated by the dotted lines in Fig. 2, that is to say, in such a position that the weight of the glass in the marver will tend to elongate the parison, rotary motion can be imparted to the said marver by means of the handle $e'$ in the same direction as that which is imparted to the marver during its movement into this position, the pawl offering no resistance to this movement.

To prevent the parison from becoming too much elongated in the marver I advantageously fix on one part thereof a plug $e^2$, Figs. 3 and 4, forming a stop or shoulder for the end of the parison, the said plug being made adjustable, for instance, by screw-threading it, as shown and being provided with a hole $e^3$ for the introduction of the glass into the marver.

In practice the air for blowing the glass in the marver is preferably introduced when the latter is in the dotted position, Fig. 2, and this air may be obtained from a suitable reservoir and conveyed to the marver through the tube $l$ sliding within the hollow shaft $b^{13}$. This tube $l$ at its end adjacent to the marver carries a nozzle $l'$ adapted, when the tube is moved in the manner hereinafter described, to enter into the mouth-forming portion of the marver so as to force out the surplus glass from this neck portion and at the same time admit air to form the parison. In practice I find it advantageous to make this nozzle $l'$ of a square section, as shown in Figs. 11 and 12, which are respectively an elevation and plan of the nozzle detached from the tube. The upper surface of this nozzle which comes into direct contact with the glass is also advantageously formed spirally so that, as the marver rotates, practically only the highest part of the said nozzle is in contact with the glass, thereby affording a free space into which the air can enter when starting to blow and preventing the admission of glass into the apertures through which the air escapes. The longitudinal movement of the tube $l$ (necessary for forcing the nozzle into the neck-molding portion of the marver) is effected by means of a cam $l^2$ shown most clearly in Fig. 4, the return movement of the said tube being effected by a spring $l^x$, Fig. 3. The said cam is secured to a sleeve $l^3$ surrounding the shaft $e$ and secured against rotation by means of a pin $l^4$ in one of the bearings $d'$. Upon the inner end of the tube $l$ is fixed a chamber $l^5$ having a flat bottom against which the cam can act and provided with a stuffing-box $l^6$ sliding upon a tube $l^7$ connected to a hollow ring $l^8$ rotating in a corresponding box $l^9$. This box $l^9$ is secured to one of the bearings $d'$, as shown in Fig. 3, and is connected directly with the air-supply pipe $l^{10}$. Permanent communication is effected between the fixed box $l^9$ and the hollow ring $l^8$ rotating therein by forming in one wall of the said ring a slot or a series of slots $l^{11}$. With this arrangement it will be understood that air can be conveyed to the marver in whatever position the latter may be: the hollow ring $l^8$ providing for the rotary movements and the stuffing-box $l^6$ for the up and down movements of the pipe $l$ under the action of the cam. In the air-pipe $l^{11}$ is placed a cock or valve $l^{12}$ operated by a lever $l^{13}$ under the control of the operator; the said lever being acted upon by a spring $l^{14}$ which normally retains it closed.

$m, m$, Figs. 13 to 16, indicate the two halves of the mold which are mounted upon slides $m', m'$ adapted to be moved backward and forward upon a table $m^2$ carried by a bracket $m^3$ upon the frame $a$ by means of screws $m^4$, $m^5$. The screw $m^4$ adapted to be directly operated by means of a crank-handle $m^6$ and the screw $m^5$ (which has its thread cut at the same angle to that of the screw $m^4$) derives its motion from the said screw $m^4$ through the medium of the bevel-wheels $m^7, m^7, m^8$. The wheel $m^8$ is internally screw-threaded and carries the screw-threaded shaft of a stud or table $m^9$, designed to support the parison during the time that the latter is released from the marver and while within the mold. The pitch of the screw with which the said stud or table is provided is such that, during the time that the mold is being closed by means of the screws $m^4, m^5$, the stud will be raised to the desired position to form the bottom of the bottle.

Suitable means are provided for preventing the rotation of the stud or table $m^9$ by the wheel $m^8$, for instance, the lower part of the screw which projects below the said wheel is provided with a slot into which a pin $m^{10}$ passing through the standard $m^{11}$ of the table enters. The said standard $m^{11}$ is provided with rack-teeth $m^{12}$ with which a pinion $m^{13}$ mounted in bearings upon the bracket $m^3$ engages for the purpose of enabling the said table to be raised or lowered as required. $m^{14}$ is a screw which serves to secure the table in any position in which it may be adjusted.

$n$ indicates a bar having a standard $n'$ adjustably mounted in a socket $n^2$ connected to one of the slides $m'$ of a mold part so as to move therewith: the bar $n$ having at one end a notch $n^3$.

$n^4$ indicates a bar sliding in guides $n^5, n^5$ secured to the casting $c$ and having a projection $n^6$ designed, when the bar is reciprocated in one or the other direction, to impinge against the free arm of the bell-crank lever $b^{21}$. The said bar is provided on its under side with inclines $n^7, n^7, n^8, n^8$ designed to impinge against inclined surfaces $n^9, n^9, n^{10}$, $n^{10}$ in the guides $n^5, n^5$. Springs $n^{11}, n^{11}$ press the said bar against its guides and when the marver is in an inverted position, as shown in Fig. 13, also support the same.

At one end of the bar $n$ is a lug $n^{12}$ with which the notch $n^3$ is designed to engage.

In the operation of the machine the necessary quantity of molten metal for forming a bottle is placed in the marver when the latter is in its uppermost position, as shown in Figs. 1 and 2, the said metal flowing into the lower portion of the marver, as indicated at $o$, Fig. 3. The marver is then moved to the position indicated by the dotted lines in Fig. 2, and during this movement the nozzle $l'$ on the air-tube is forced into the glass to the position indicated by the dotted lines in Fig. 3 by means of the cam $l^2$. When in this position rotary motion is imparted to the marver by means of the handle $e'$ and, at the same time, air is admitted through the tube $l$ by depressing the lever $l^{13}$ to open the air-supply cock $l^{12}$. The parison having been thus far formed the marver is moved to its lowermost position in order to bring the parison directly over the stud $m^9$, as shown in Fig. 13, the said marver being revolved by the handle $e'$ into the position in which its two parts can open in a direction at right angles to the movement of the parts of the mold. When in this position the operator commences to move the mold parts toward each other, whereby the notch $n^3$ of the bar $n$ is caused to engage with the projection $n^{12}$ of the bar $n^4$ and thereby move the said bar $n^4$ to cause the projection $n^6$ thereon to impinge against the free arm of the bell-crank lever $b^{21}$ and move the clutch-box $b^{20}$ to engage with the clutch-teeth of the bevel-wheel $b^{16}$ so as to cause the rotation of the shaft $b^{\times}$ of the worm $b^8$ to open the marver. As the movement of the bar $n^4$ continues the inclined surfaces $n^7$, $n^7$ thereon come into contact with the inclines $n^9$, $n^9$ upon the guides, whereby the said bar is moved against the pressure of the springs $n^{11}$, $n^{11}$ to cause the disengagement of the projection $n^{12}$ from the notch $n^3$ of the bar $n$. The inward movement of the mold parts is then continued until the parison is embraced thereby. A further quantity of air is now blown into the parison whereby the bottle is finished as shown in Fig. 16. The operator now rotates the handle $m^6$ to open the mold sufficiently to uncover the bottle which remains suspended from the tongs or gripping pieces $f$, $f$ and he then takes hold of the bottle by any suitable appliance and at the same time pulls back the lever $h'$ by means of a projection $h^{\times}$ thereon so as to disengage the fork $h$ from the gripping pieces, the bottle can then be disengaged from the latter, the springs $f^3$, $f^3$ allowing the said tongs to yield sufficiently for this purpose. The operator then moves back the mold parts still farther until the notch $n^3$ again engages with the projection $n^{12}$ and moves the bar $n^4$ to cause the projection $n^6$ to engage with the bell-crank lever $b^{21}$ and the engagement of the clutch-box with the teeth of the wheel $b^{17}$, whereby the worm $b^8$ closes the marver. A further backward movement of the molds causes the impingement of the inclines $n^8$, $n^8$ of the bar $n^4$ against the inclines $n^{10}$, $n^{10}$ of the guides thereof, whereby the said bar is moved to disengage its projection from the notch $n^3$. This operation having been completed the operator moves the handle $i$ to disengage the spring-catch $i^2$ from the notch $j^2$ in which it is located and again swings the marver to its uppermost position ready for another operation.

In order to facilitate the swinging movements of the marver and the connected parts I advantageously provide the frame $d$ with arms $p$, $p$ carrying balance weights $q$, $q$.

As during the working of the machine considerable inconvenience might be caused by the parts becoming heated I advantageously form the casting $c$ in two parts separated by a sheet $r$ of insulating material such as asbestus, in order to confine the heat as much as possible to the parts immediately adjacent to the marver.

Although I have described my marver as being used in conjunction with molds it is to be understood that such molds may be dispensed with, the bottle being completely made in the marver itself. In this case I wholly or partially close the opening of the marver which is of the shape of the bottles required and shape the closing pieces or plug so as to form the bottom of the bottle.

Having now particularly described and ascertained the nature of my said invention and in what manner the same is to be performed, I declare that what I claim is—

1. In apparatus for the manufacture of glass bottles and the like, a cylindrical vessel such as shown at $b$, which I term a marver adapted to be rotated, and serving to roll the parison or bloom to bring it into shape before it enters the finishing mold, all substantially as described.

2. In a machine for making glass bottles and the like provided with a marver such as above described, the combination with said marver, of a frame carrying the same and mounted on a shaft whereby the marver can be swung from a vertical to a horizontal and other positions, substantially in the manner described.

3. In a machine for the manufacture of glass bottles and the like, a marver formed in two parts pivotally mounted on horizontal spindles in order that they may both be moved away from each other in vertical planes to enable the parison or bottle contained by the marver to be removed therefrom, substantially as described.

4. In combination with the marver mounted and pivoted as described, means substantially as shown and described whereby the marver shall be revolved by the act of and during its movement from its vertical to its horizontal position.

5. In a machine for making glass bottles and the like, the combination with a marver constructed of two pivoted portions $b'$, $b^2$, each having a projecting portion $b^3$ provided with a slot $b^4$, to receive a square spindle, of tongs adapted to support the bottle when the marver is opened, all substantially as described.

6. In a machine for making glass bottles and provided with a rotating marver as hereinbefore described mounted on a pivoted frame adapted to swing the marver to a vertical position, means substantially as described serving to blow the glass contained by such marver, all substantially as set forth.

7. In a machine for making glass bottles and the like, the combination with a rotating two-part marver, of a pivoted frame supporting the same and adapted to carry the marver from an upright to an inverted position; and a molding apparatus serving to receive the parison from the marver and to hold it while air is blown into the parison to finish the bottle.

BARNARD ALFRED SPAULL.

Witnesses:
JOHN E. BOUSFIELD,
*Of the firm of G. F. Redfern & Co., 4 South Street, Finsbury, London, Patent Agents.*
A. ALBUTT.